(No Model.)
P. J. KOTTCAMP.
ADJUSTABLE ROD AND BOX FOR WATER OR OTHER PIPES.
No. 544,410. Patented Aug. 13, 1895.
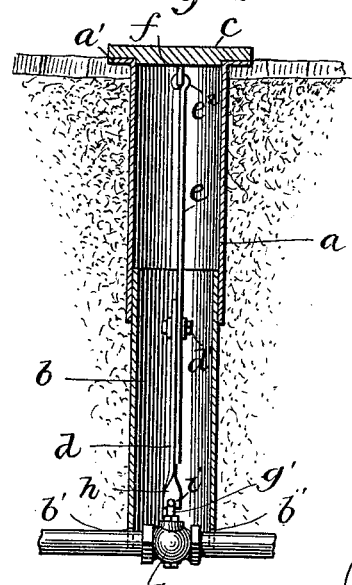
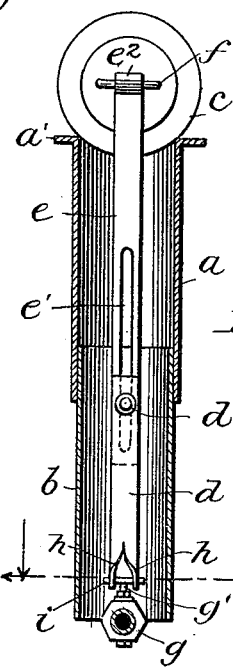
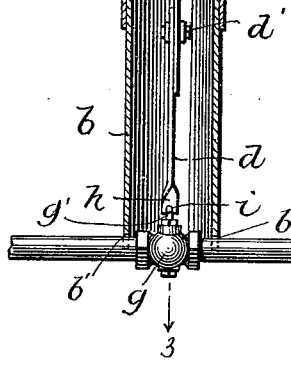
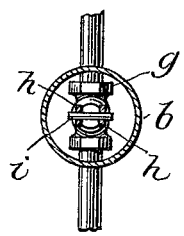
Witnesses
Jno G. Hinkel
Will E. Neff
Inventor
Philip J. Kottcamp
By J. H. Watson, Attorney

UNITED STATES PATENT OFFICE.

PHILIP J. KOTTCAMP, OF YORK, PENNSYLVANIA.

ADJUSTABLE ROD AND BOX FOR WATER OR OTHER PIPES.

SPECIFICATION forming part of Letters Patent No. 544,410, dated August 13, 1895.

Application filed March 25, 1895. Serial No. 643,079. (No model.)

*To all whom it may concern:*

Be it known that I, PHILIP J. KOTTCAMP, a citizen of the United States, residing at York, in the county of York and State of Pennsylvania, have invented certain new and useful Improvements in an Adjustable Rod and Box for Water or other Pipes, of which the following is a specification.

The purpose and object of this invention is to produce an adjustable box and valve operating rod for water, gas, and other pipes which shall be of cheap and simple construction, easy of operation, and in which the parts are all connected, so that none of them are liable to be detached and lost.

The invention consists in an extensible box, the parts of which slide telescopically one upon the other, in combination with an extensible rod, the upper end of which is attached to the cover of the box, so that it may be turned by turning the cover, and the lower end of which is preferably connected to the valve.

The invention further consists in details of construction and arrangement which I will now proceed to describe, reference being had to the accompanying drawings, in which—

Figure 1 is a sectional view of my improved box and valve-rod, the cover being closed. Fig. 2 is a similar view showing the cover open, so that the interior of the box may be inspected or cleaned. Fig. 3 is a like sectional view taken on the line 3 3 of Fig. 2; and Fig. 4 is a section on the line 4 4 of Fig. 3.

Referring to the drawings, $a$ indicates the upper and $b$ the lower section of the box, the upper section preferably sliding upon the outside of the lower section telescopically. The upper section is preferably formed with a flange $a'$ to sustain it in its proper position in the ground, and the lower section is cut away at $b'$ to conform to the shape of the pipe on which it rests. Upon the upper section rests a cover-plate $c$. The box-sections and the cover are preferably circular in horizontal section, although they may be polygonal if desired.

The valve-operating rod consists of two strips or plates $d\ e$, one of which is provided with a slot $e'$, while the other is provided with a headed pin $d'$, adapted to slide in the slot and connect the two parts of the rod together. The upper section of the rod is permanently connected to the cover, preferably by hinge or pivot joint. As shown, there is a rod or bail $f$ connected to the cover, and the upper end of the section $e$ is bent into an eye $e^2$, through which the rod $f$ passes. The lower section $d$ of the rod is connected to the stem $g'$ of the valve $g$. As shown, the section $d$ is split centrally at the bottom, and the two tongues $h$ thus formed are twisted until their lower ends are parallel. The opposite ends of the T-shaped handle $i$ of the valve pass through perforations in the tongues $h$, as shown, the tongues being sprung over the handle. This forms what may be termed a "permanent" connection between the valve-operating rod and the valve.

It will be seen that the valve may be opened or closed without opening the box, and thus the interior of the box may be kept free from dirt and the valve and rod kept in good working order. If, however, it is necessary to inspect the valve, the cover may be raised and turned into a vertical position, as shown in Figs. 2 and 3, thus exposing the entire interior of the box to view.

My improved box is adjustable, so that it may be used in connection with pipes placed at various depths below the surface. Another valuable feature is the connection of the valve-stem and operating-rod to the cover, so that an additional key or wrench is not required to operate the valve.

Having described my invention, what I claim, and desire to secure by Letters Patent, is—

1. The combination with the box consisting of upper and lower sections, adjustable, one upon the other, to vary its depth, of the lid adapted to the upper section of the box, and the extensible operating rod connected to and arranged to be turned by the lid, said rod being provided at its lower end with means for attachment to a valve stem, substantially as described.

2. The combination with a box composed of adjustable upper and lower sections, of a lid for the box, and a valve rod having upper and lower sections adjustably connected, the upper section being hinged to the box cover and the lower section being adapted for attachment to a valve stem, substantially as described.

3. The combination with the box composed of upper and lower sections adjustable one upon the other, and a lid fitting the upper section, of a bail or rod *f* upon the lid, and a valve operating rod consisting of two plates having a pin and slot connection, the upper plate having an eye through which the bail of the cover passes, and the lower rod section having two tongues or branches which are perforated for engagement with the handle of a valve, substantially as described.

In testimony whereof I affix my signature in presence of two witnesses.

PHILIP J. KOTTCAMP.

Witnesses:
W. F. BENJ. STEWART,
B. R. PAXTON.